G. RAPAVY.
DOUGH CUTTER.
APPLICATION FILED JAN. 19, 1920.
1,343,844.
Patented June 15, 1920.
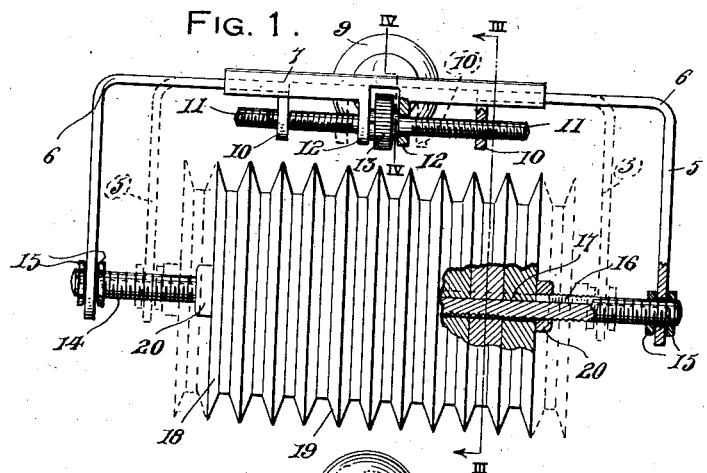
FIG. 1.
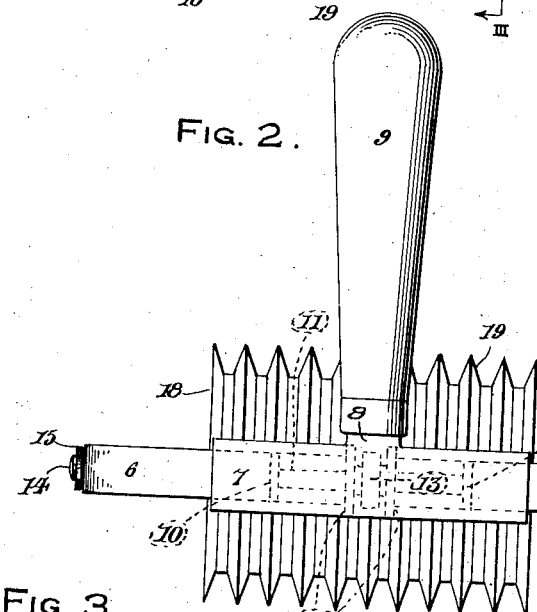
FIG. 2.
FIG. 5.
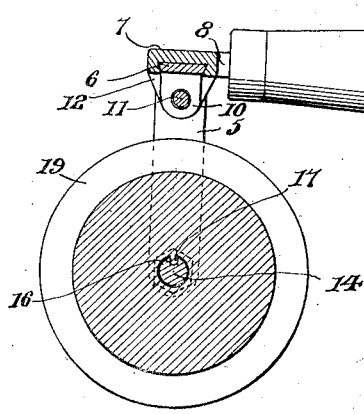
FIG. 3.
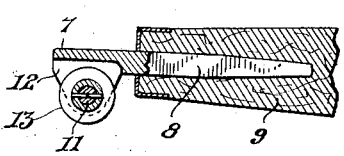
FIG. 4.
Inventor
G. Rapavy
By A. M. Wilson
Attorney

UNITED STATES PATENT OFFICE.

GASPAR RAPAVY, OF LOUISVILLE, NEBRASKA.

DOUGH-CUTTER.

1,343,844.  Specification of Letters Patent.  Patented June 15, 1920.

Application filed January 19, 1920. Serial No. 352,370.

*To all whom it may concern:*

Be it known that I, GASPAR RAPAVY, a citizen of Czecho-Slovakia, residing at Louisville, in the county of Cass and State of Nebraska, have invented certain new and useful Improvements in Dough-Cutters, of which the following is a specification.

This invention relates to certain new and useful improvements in dough cutters, and particularly of that type involving a rotatable cutting member formed of a plurality of circular knives which are journaled for rotation in a suitable frame having manual means for the operation thereof.

The primary object of the present invention is to improve upon the specific construction of prior devices of this kind in order that the same may meet with all of the requirements of a successful commercial use.

Another object of the invention is to make the handle-carrying frame of the cutter adjustable in size whereby the number of cutter knives associated therewith may be varied at will as desired.

A still further object of the invention is to carry out the last mentioned object by means of a simple, practical and efficient means.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application, and in which like designating characters refer to corresponding parts throughout the several views, Figure 1 is a front elevational view of a dough-cutter constructed in accordance with the present invention, certain parts of the same being shown broken away for the illustration of details, and the varying of the size of the cutter being indicated by dotted lines, Fig. 2 is a top plan view of the device shown in Fig. 1, Fig. 3 is a sectional view taken substantially on line III—III of Fig. 1, Fig. 4 is a sectional view taken substantially upon line IV—IV of Fig. 1, and Fig. 5 is a fragmentary elevational view illustrating the manner in which the cutter knives may be maintained in position upon their spindle when the latter is substantially completely inclosed by cutter knives wherein removal of one of the jam nuts is necessary.

Referring more in detail to the several views, the present invention embodies a substantially inverted U-shaped frame 5 preferably formed by the bending of a strip of metal to form each angular end member 6 thereof, the horizontal legs of said angular member 6 being slidable within a horizontally disposed connector 7 as shown in Fig. 3 wherein they are retained by coöperating dove-tailed formation of the members 6 and the guide groove in the member 7. A tang 8 extends rearwardly from the guide or connector 7 substantially centrally of the latter and has any form of handle 9 secured thereon. The adjacent free ends of the horizontal arms of the angular end members 6 are provided with depending ears 10 which are internally screw-threaded for reception of the oppositely threaded ends of an adjusting screw 11. The adjusting screw 11 is journaled in suitable ears 12, which depend from the connector 7 between the ears 10 of the members 6, and a suitable knurled wheel or the like as indicated at 13, may be secured upon the adjusting screw 11 for the convenient rotation of the latter. It will thus appear that when the handle 9 is grasped, and the wheel 13 is rotated, the screw 11 is threaded into or out of the ears 10, depending upon the direction of rotation of the screw, for causing sliding movement of the end members 6 relative to each other and to the connector 7. Obviously, this decreases or increases the distance between the vertical legs of the members 6 as desired.

A threaded spindle 14 has its opposite ends journaled in suitable apertures provided in the lower ends of the vertical arms of the end members 6, and said spindle 14 is retained in its operative position by nuts 15 which are threaded upon the ends of the spindle 14 at opposite sides of the vertical legs of the end members 6. It will of course, be understood that the nuts 15 can be threaded to their proper positions upon the spindle 14, in accordance with the adjustment of the end members 6 toward and away from each other.

The spindle 14 is provided with a longitudinal groove 16 adapted for reception of the keys 17 which are formed upon the cutter knives 18 to project inwardly as seen in Fig. 3. The cutter knives 18 are centrally apertured so as to be slid onto the spindle 14 when the latter is detached from the members 6 and, by reason of the engagement of their keys 17, with the spindle groove 16, the spindle 14 is caused to rotate with the cutter knives 18.

The cutter knives 18 may be of any desired form, but are herein shown as relatively wide disks each having a pair of annular cutting edges 19. When the desired number of knives 18 have been placed upon the spindle 14, a suitable jam nut 20 may be threaded upon said spindle 14 at each end for the purpose of holding the knives rigidly in contiguous relation and in the desired position upon the spindle 14.

Should it be desirable to place as many cutters 18 upon the spindle 14 as the latter will conveniently accommodate, the jam nuts 20 may be entirely dispensed with and the innermost one of each pair of nuts 15 may be adjusted as shown in Fig. 5 to bear against the end cutter disks or knives for holding all of the latter in contiguous relation.

In operation, the outer nuts 15 may be removed and the adjusting screw 11 may then be rotated for sufficiently separating the end frame members 6 to allow removal of the spindle 14. The remaining nuts 15, as well as the jam nuts 20 may then be removed, whereupon the desired number of cutter knives 18 may be positioned upon the spindle 14. The jam nuts 20 may then be replaced for holding the knives operatively positioned and the inner nuts 15 can then be threaded upon the free ends of the spindle 14. The spindle 14 is then positioned so that its ends will enter the apertures in the vertical legs of the end members 6 when the adjusting screw 11 is reversely rotated for bringing the end members 6 toward each other. The end or outer nuts 15 are then threaded onto the spindle 14, so that the latter is not clamped to the end members 6 and the device is then ready for use. When a strip of dough is placed upon a table, the handle 9 is grasped and the device is disposed so that the knives 18 rest upon the dough. The operator then exerts a downward force and a forward movement so as to cause the knives to rotate for cutting the dough up into long strips or the like.

While the form of the invention herein shown and described is what is believed to be the preferred embodiment thereof, it is nevertheless to be understood that various forms, modification and arrangements of the parts may be made without departing from the spirit and scope of the invention as claimed.

Having thus described my invention, what I claim as new and desire to secure by Letters Patent, is:—

1. A dough cutter comprising a frame formed of a pair of angular end members each having one leg horizontally disposed and the other vertically disposed, a member slidably connecting the horizontally disposed legs of said end members, means for adjusting the end members toward and from each other having operative connection with the horizontally disposed legs of the end members, a handle for said frame, a spindle having its opposite ends journaled in the lower ends of the vertical legs of said end members, a plurality of cutter disks keyed on said spindle and means adjustable longitudinally on said spindle to clamp the cutter knives in contiguous relation upon said spindle whether the same are reduced or increased in number.

2. A dough cutter comprising a frame formed of a pair of angular end members, a member slidably connecting said end members, a handle attached to the last named member, means for adjusting the end members toward and away from each other, a spindle having its opposite ends journaled in said end members, a plurality of cutter disks on said spindle, and means adjustable longitudinally on said spindle to clamp the cutter knives in contiguous relation upon said spindle whether the same are reduced or increased in number.

In testimony whereof I affix my signature.

GASPAR RAPAVY.